(12) United States Patent
Welnick et al.

(10) Patent No.: US 7,609,676 B2
(45) Date of Patent: Oct. 27, 2009

(54) METHOD FOR PREVENTING REPORTING OF DUPLICATE PILOTS WITHIN A COMMUNICATION SYSTEM

(75) Inventors: William E. Welnick, Poway, CA (US); Dean E. Thorson, Grayslake, IL (US)

(73) Assignee: Motorola, Inc., Schaumburg, IL (US)

( * ) Notice: Subject to any disclaimer, the term of this patent is extended or adjusted under 35 U.S.C. 154(b) by 410 days.

(21) Appl. No.: 11/171,618

(22) Filed: Jun. 30, 2005

(65) Prior Publication Data

US 2007/0008876 A1     Jan. 11, 2007

(51) Int. Cl.
*H04W 4/00* (2009.01)
(52) U.S. Cl. .................. 370/331; 370/320; 370/336; 455/450; 455/456.1
(58) Field of Classification Search .......... 455/450, 455/456.1; 370/310, 336, 320
See application file for complete search history.

(56) References Cited

U.S. PATENT DOCUMENTS

| | | | | |
|---|---|---|---|---|
| 5,926,470 A | * | 7/1999 | Tiedemann, Jr. | 370/334 |
| 6,542,743 B1 | * | 4/2003 | Soliman | 455/436 |
| 7,245,919 B2 | * | 7/2007 | Lau et al. | 455/450 |

* cited by examiner

*Primary Examiner*—George Eng
*Assistant Examiner*—Amancio Gonzalez
(74) *Attorney, Agent, or Firm*—Vedder Price, P.C.

(57) ABSTRACT

A method within a communication device (105) for preventing reporting of duplicate pilots within a communication system (100) is disclosed. The method includes communicating with one or more base stations (110); monitoring and maintaining a pilot set (200); allocating one or more pilots not found in the active set (205), the candidate set (210), or the neighbor set (215) to a remaining set (220) comprising one or more remaining set pilots; providing a remaining set window (225) around each remaining set pilot; and eliminating a remaining set pilot when the remaining set window (225) around the remaining set pilot overlaps any of the active, the candidate, or the neighbor set pilots.

8 Claims, 7 Drawing Sheets

FIG. 7

METHOD FOR PREVENTING REPORTING OF DUPLICATE PILOTS WITHIN A COMMUNICATION SYSTEM

FIELD OF INVENTION

The invention relates generally to communication systems, and more particularly to a method of operation within a communication device to prevent reporting of duplicate pilot signals within a communication system.

BACKGROUND OF THE INVENTION

A wireless communication system includes a number of base stations, scattered over a geographic area, to provide service for a number of communication devices, such as, personal data assistants (PDA), cellular telephones, messaging devices, mobile devices, and other suitable devices that can move throughout a geographic area. In a code division multiple access (CDMA) system, each base station continuously transmits a pilot channel signal on the forward channel. The pilot channel signal transmitted by each base station has the same spreading code but with a different code phase offset. The phase offset allows the pilot signals to be distinguished from one another, which in turn allows the base stations to be distinguished. The communication device monitors the pilots and measures the received energy of the pilots.

While the communication device is communicating with the base station(s), the communication device must constantly monitor and maintain three sets of pilot signals (collectively referred to as a Pilot Set): an active set, a candidate set, and a neighbor set. The active set consists of pilot signals associated with the forward traffic channels assigned to service the wireless device. The candidate set consists of pilots that are not currently in the active set but have been received by a particular communication device with sufficient signal strength to indicate that the associated forward traffic channels could be successfully demodulated. The neighbor set consists of pilot signals that are not currently in the active set or candidate set but are likely candidates for hand off. The remaining set consists of all pilots not found in the active set, candidate set, or neighbor set.

As the communication device moves from the region covered by one base station to another, the communication device promotes certain pilots from the neighbor or remaining set to the candidate set, and certain pilots of the candidate set are subsequently promoted to the active set by the base station. The communication device provides the base station or base stations pilot signal strength measurement data corresponding to the received energy of the pilot signals via a pilot strength measurement message (PSMM). In response, the base station notifies the communication device of the promotion from the candidate set to the active set via a hand off direction message. The process of continually updating the pilot set during a communication call is referred to as "pilot set maintenance."

Using current technology, a problem with pilot set maintenance can be observed. In some instances, the communication device erroneously reports two duplicate pilots to the network thinking that they are different pilots, one an already reported active pilot, and the second the same pilot whom the communication device mistakenly thinks is in the remaining pilot set. The root of the problem is based in the configuration of the network, and thus the communication device currently has no way of preventing this from happening.

The network, for example, may have configured a rather large search window size for the remaining set. The network's remaining set window size dictates to the communication device's searcher how wide a search to use in order to find remaining set pilots. The larger the size of the window the wider the search. When the remaining set window size is too large it is possible that active, candidate, and neighbor pilots fall within the search window for a remaining set pilot that is close, since remaining set pilots will be immediately adjacent to nonconsecutive active, candidate, and neighbor pilots.

Pilots in CDMA are identified by their position in pilot PN sequence offset index space, hereafter referred to as PN (pseudonoise) space. Each pilot PN sequence offset index corresponds to a unit of 64 PN chips of a Forward Pilot Channel, relative to the zero offset pilot PN sequence. Pilots that are close in number are close together in PN space. For example the pilot identified as PN=36 is 128 chips away from the pilot identified as PN=38. If the pilot PN=36 was in the active set, pilot PN=38 was in the remaining set, and the remaining set search window was +/− 160 chips then when the wireless communication device searched the remaining set pilot PN=38 it would really find the active pilot PN=36 within its search window.

Further, if the network provides the communication device with conflicting searcher window sizes and PN information, the communication device can currently mistakenly report the same pilot in multiple entries in the pilot strength measurement message for handoff purposes.

For example, the network may command the communication device to do a remaining set search on a window that's +/− 160 chips in width. The communication device, for this example, is active on PN=36 and has seen a base station with PN=38 in its past history. Because each PN is equivalent to 64 chips, the search window of +/− 160 chips is equivalent to a window of +/− 2.5 PNs (which places the PN=36 active set pilot within the search window for the PN=38 remaining set pilot). The communication device then reports up two pilots (PN=36,38) even though just one exists.

Poor configuration of the remaining set (rset) window network parameter can cause poor voice quality for voice over IP (VOIP) data calls even in strong signal conditions. This is due to the excess communication between the communication device and the network for pilot set maintenance.

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail the method for preventing reporting of duplicate pilots within a wireless communication system in accordance with the present invention, it should be observed that the present invention resides primarily in combinations of method steps and apparatus components related to the method for preventing reporting of duplicate pilots within a wireless communication system. Accordingly, the apparatus components and method steps have been represented where appropriate by conventional symbols in the drawings, showing only those specific details that are pertinent to understanding the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

It will be appreciated the method for preventing reporting of duplicate pilots within a wireless communication system described herein may be comprised of one or more conventional processors and unique stored program instructions that control the one or more processors to implement, in conjunction with certain non-processor circuits, some, most, or all of the functions of the method for preventing reporting of duplicate pilots within a wireless communication system described herein. The non-processor circuits may include, but are not limited to, a radio receiver, a radio transmitter, signal drivers, clock circuits, power source circuits, and user input devices. As such, these functions may be interpreted as steps of a method for preventing reporting of duplicate pilots within a wireless communication system. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The present invention is a method for preventing reporting of duplicate pilots within a wireless communication system. In accordance with a first embodiment of the present invention, a mobile based solution is provided which eliminates a pilot from the remaining set if the remaining set window around the remaining set pilot overlaps any of the active, candidate, or neighbor set pilots. In accordance with a second embodiment of the present invention, a network based solution prevents the user from configuring the network from entering remaining set windows that can cause overlaps.

Figure 1:
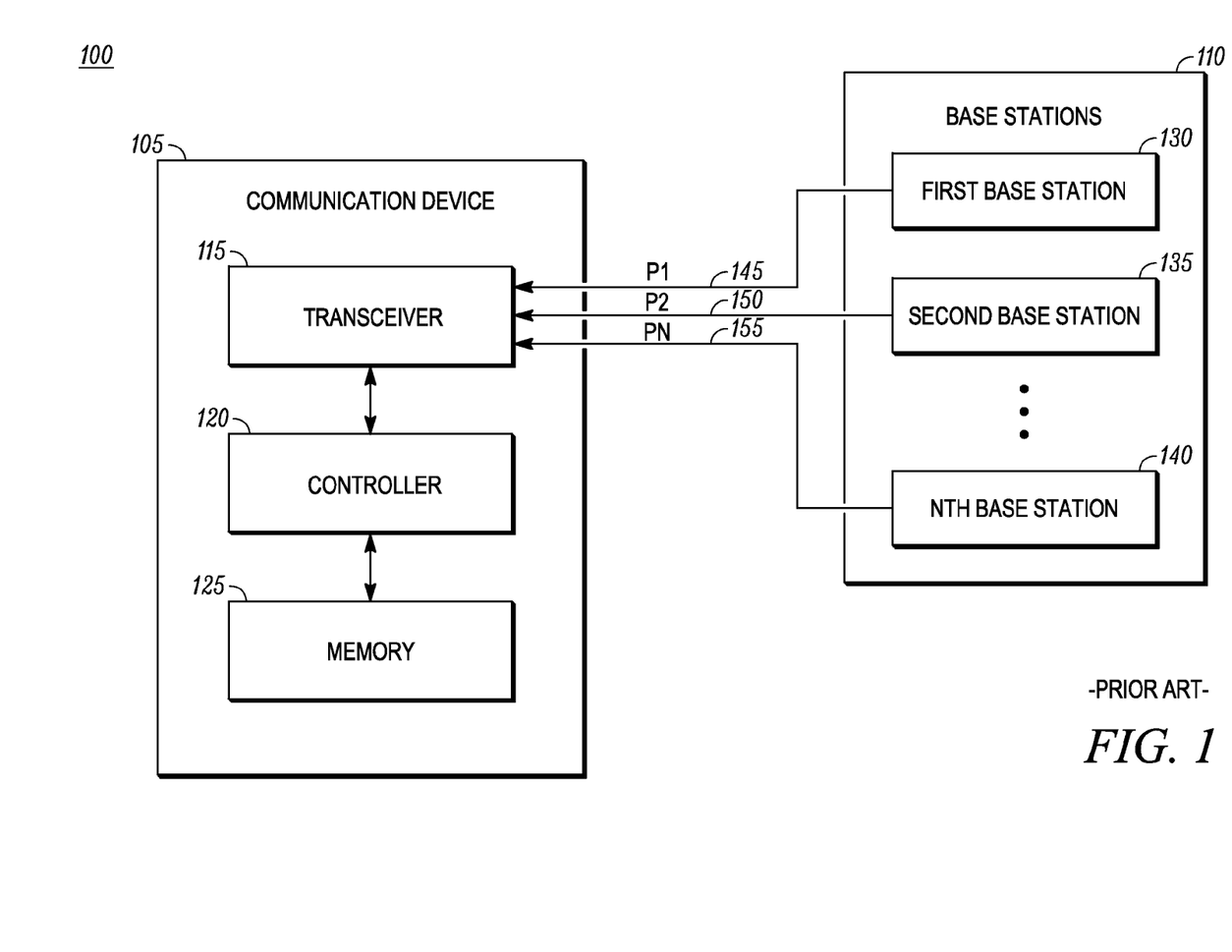
FIG. 1 is a block diagram illustrating an example communication system for implementing one exemplary embodiment of the invention.

Referring to FIG. 1, a block diagram illustrating an example of a communication device 105 and a plurality of base stations 110 operating within a communication system 100 is illustrated.

It will be appreciated by one of ordinary skill in the art that the communication system 100, in accordance with the present invention, can operate in accordance with at least one of several standards. These standards include analog, digital or dual-mode communication system protocols such as, but not limited to, the Advanced Mobile Phone System (AMPS), the Narrowband Advanced Mobile Phone System (NAMPS), the Global System for Mobile Communications (GSM), the IS-136 Time Division Multiple Access (TDMA) digital cellular system, the IS-95 Code Division Multiple Access (CDMA) digital cellular system, the CDMA 2000 system, the Wideband CDMA (W-CDMA) system, the Personal Communications System (PCS), the Third Generation (3G) system, the Universal Mobile Telecommunications System (UMTS) and variations and evolutions of these protocols. In the following description, the term "wireless communication system" refers to any of the systems mentioned above or an equivalent. Additionally, it is envisioned that wireless communication systems can include wireless local area networks, including pico-networks, or the like.

Similarly, it will be appreciated by one of ordinary skill in the art that each of the communication device 105, in accordance with the present invention, can operate within any of the communication systems described previously herein or an equivalent. For example, a communication device can be a mobile cellular telephone, a mobile radio data terminal, a mobile cellular telephone having an attached or integrated data terminal, a two-way messaging device, or an equivalent. Similarly, the communication device can be any other electronic device such as a personal digital assistant or a laptop computer having wireless communication capabilities. In the following description, the term "communication device" refers to any combination of the devices mentioned above or an equivalent.

The communication device 105, by way of example only, can be embodied in a cellular radiotelephone having a conventional cellular radio transceiver circuitry, as is known in the art, and will not be presented here for simplicity. The invention is alternatively applied to other communication devices such as, for example, messaging devices, personal digital assistants and personal computers with communication capability, mobile radio handsets, cordless radiotelephone and the like.

The communication device 105 includes conventional device hardware (also not represented for simplicity) such as user interfaces, alert circuits, displays, and the like, that are integrated in a compact housing. Each particular communication device will offer opportunities for implementing the present invention.

As illustrated in FIG. 1, the communication device 105 includes a transceiver 115, a controller 120, and a memory 125. One or more antennas (not illustrated) intercept transmitted signals from one or more networks and transmits signals to the one or more networks. Coupled to the one or more antennas, the transceiver 115 employs conventional demodulation techniques for receiving the communication signals.

The transceiver 115 is coupled to the controller 120 and is responsive to commands from the controller 120. When the transceiver 115 receives a command from the controller 120, the transceiver 115 sends a signal via an antenna to one or more of the plurality of base stations 110. In an alternative embodiment (not shown), the communication device 105 includes a receive antenna and a receiver for receiving signals from one or more of the communication systems and a transmit antenna and a transmitter for transmitting signals to one or more of the communication systems. It will be appreciated by one of ordinary skill in the art that other similar electronic block diagrams of the same or alternate type can be utilized for the communication device 105. Coupled to the transceiver 115, is the controller 120 utilizing conventional signal-processing techniques for processing received messages. It will be appreciated by one of ordinary skill in the art that additional controllers can be utilized as required to handle the processing requirements of the controller 120. The controller 120 decodes an identification in the demodulated data of a received data message, compares the decoded identification with one or more identifications stored in the memory 125, and when a match is detected, proceeds to process the remaining portion of the received data message. The one or more identifications, for example, can be a unique selective call address assigned within a wireless communication system, an electronic mail address, an IP (internet protocol) address or any other similar identification. Further, the controller 120 processes voice communications upon receipt from the plurality of base stations 110 and processes voice communications for transmission to the plurality of base stations 110.

To perform the necessary functions of the communication device 105, the controller 120 is operatively coupled to the memory 125, which can include a random access memory (RAM), a read-only memory (ROM), an electrically erasable programmable read-only memory (EEPROM), and flash memory. The memory 125, for example, includes memory locations for the storage of one or more received or transmitted messages, one or more software applications, one or more image data, and the like. It will be appreciated by those of ordinary skill in the art that the memory 125 can be integrated within the portable communication device 105, or alternatively, can be at least partially contained within an external memory such as a memory storage device. The memory storage device, for example, can be a subscriber identification module (SIM) card. A SIM card is an electronic device typically including a microprocessor unit and a memory suitable for encapsulating within a small flexible plastic card. The SIM card additionally includes some form of interface for communicating with the communication device 105. The SIM card can be used to transfer a variety of information from/to the communication device 105 and/or any other compatible device.

Each of the plurality of base stations 110, such as a first base station 130, a second base station 135, through an nth base station 140, are adapted as message store and forward stations that encode and decode inbound and outbound messages into formats that are compatible with landline message switched computers and personal radio addressing requirements, such as cellular messages, short messaging service, or paging protocols. The base stations 110 can also function to encode and decode wireless messages that are transmitted to or received by a coupled to radio frequency transmitter or radio frequency receiver. Telephony signals are typically transmitted to and received from the base stations 110 by telephone sets such as the communication device 105. The base stations 110 then encode and schedule outbound messages to one or more communication devices, such as the communication device 105 on at least communication downlink. The at least one communication downlink, for example, can be an outbound radio frequency channel. The downlink transmission can be, for example, a data message or a voice call.

Similarly, the base station 130, 135, and/or 140 receives and decodes inbound messages such as an uplink transmission received on at least one communication uplink from one of the communication devices. The communication uplink, for example, can be one or more inbound radio frequency (RF) channels. The uplink transmission can be, for example, a data message, a reply to a data message, a voice call, or a reply to a voice call.

The communication device 105 communicates with the plurality of base stations 110, scattered over a geographic area. In accordance with the present invention, each base station continuously transmits a pilot channel signal on the forward channel which is receive by the communication device 105. For example, the first base station 130 transmits a P1 pilot signal 145, the second base station 135 transmits a P2 pilot signal 150, and the nth base station 140 transmits a PN pilot signal 155. Each pilot signal 145, 150, 155, are received by the transceiver 115 and processed by the controller 120 of the communication device 105.

Figure 2:
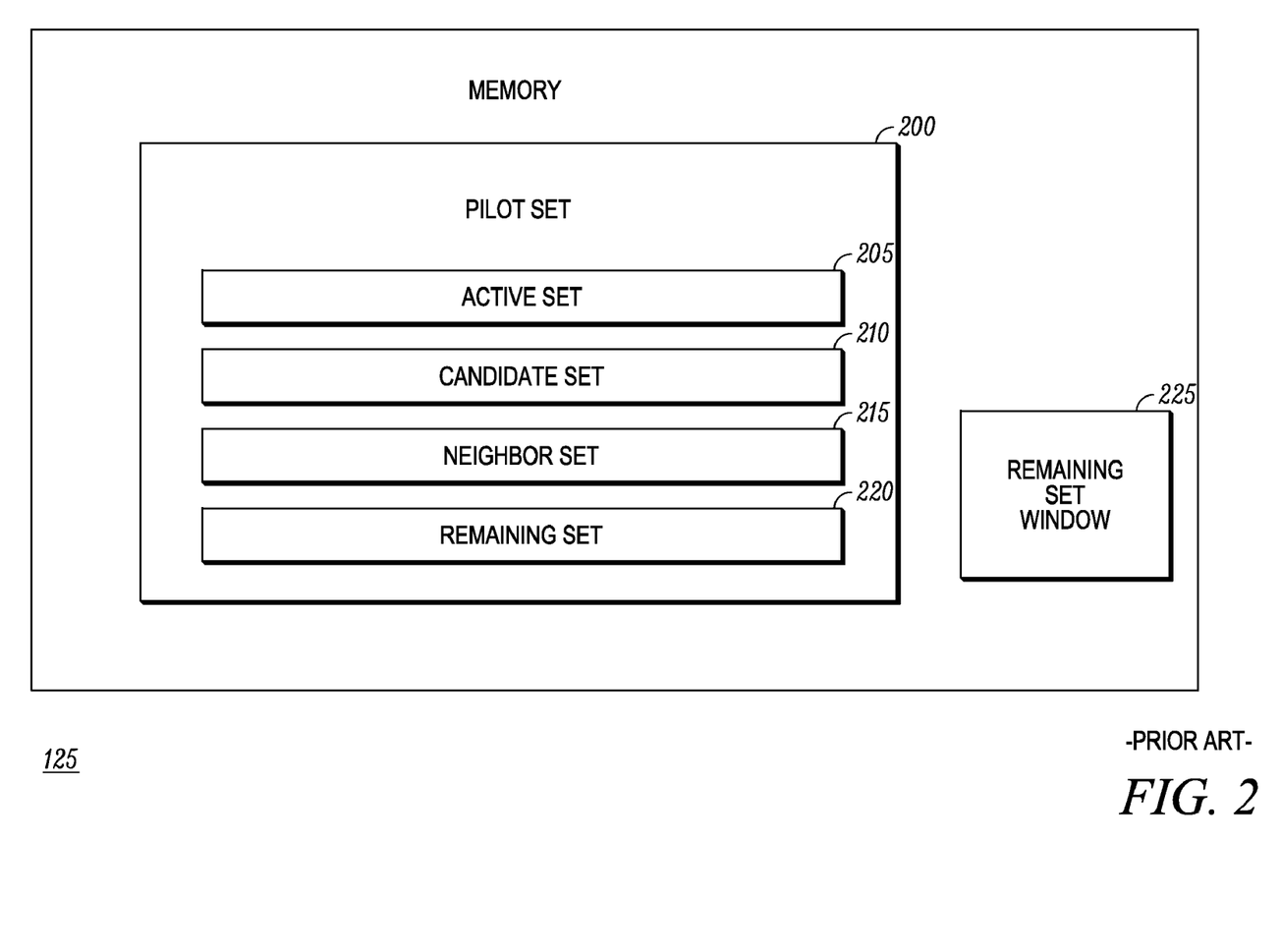
FIG. 2 is a block diagram of a memory for use within the communication device of FIG. 1 according to one exemplary embodiment of the invention.

Referring to FIG. 2, an example of the memory 125 of the communication device 105 is illustrated. As illustrated, a pilot set 200 including an active set 205, a candidate set 210, a neighbor set 215, and a remaining set 220 is stored within the memory 125. Further, a remaining set window 225 is stored within the memory 125. The active set 205 includes one or more active set pilots. For example, one or more pilots associated with one or more forward traffic channels assigned to service the communication device 105 can be allocated to the active set. The candidate set 210 includes one or more candidate set pilots. The candidate set 210, for example, can include one or more pilots that are not currently in the active set 205 but have been received by the communication device 105 with sufficient signal strength to indicate that the associated forward traffic channels could be successfully demodulated. The neighbor set 215 includes one or more neighbor set pilots. For example, one or more pilots that are not currently in the active set 205 or the candidate set 210 but are likely candidates for hand off can be allocated to the neighbor set 215. The remaining set 220 includes one or more pilots not found in the active set 205, the candidate set 210, or the neighbor set 215. The remaining set window 225 is a predetermined window around each remaining set pilot for use in various operations of the communication device 105.

FIGS. 3 through 6 are flow charts illustrating various examples of a method for preventing reporting of duplicate pilots within the communication system of FIG. 1 according to various embodiments of the invention.

Figure 3:
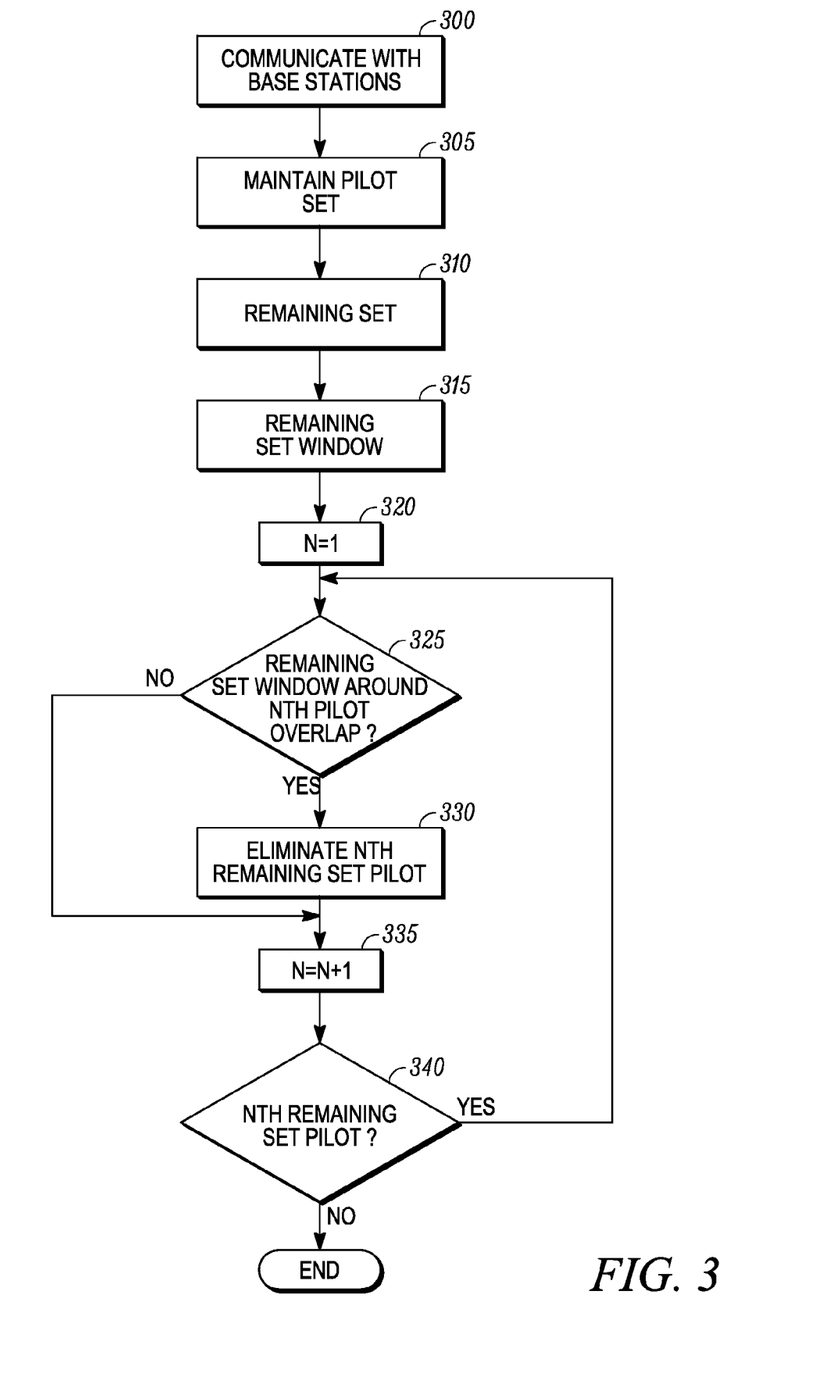
FIGS. 3 through 6 are flow charts illustrating various examples of a method for preventing reporting of duplicate pilots within the communication system of FIG. 1 according to various embodiments of the invention.

Referring to FIG. 3, the operation illustrates one example of the operation of the communication device 105 in accordance with the present invention. For example, the controller 120 of the communication device 105 can be programmed to perform the operations illustrated in FIG. 3. As illustrated, the operation begins with Step 300 in which the communication device 105 communicates with the plurality of base stations 110 within the communication system 100. Next, in Step 305, the communication device 105 maintains the pilot set 200 including the active set 205, the candidate set 210, the neighbor set 215, and the remaining set 220. Next, in Step 310, the communication device 105 allocates one or more pilots not found in the active set 205, the candidate set 210, or the neighbor set 215 to the remaining set 220. Next in Step 315, the remaining set window 225 is provided around each of the remaining set pilots stored within the remaining set 220. Next, in Step 320, a parameter is set to N=1. Next in Step 325, the communication device 105 checks the Nth remaining set pilot to determine whether the remaining set window around the Nth remaining set pilot overlaps any of the active, candidate, or neighbor set pilots. When the remaining set window around the Nth remaining set pilot overlaps one or more of the active, candidate, or neighbor set pilots in Step 325, the operation continues to Step 330 in which the Nth remaining set pilot is eliminated. Next, and when the remaining set window around the Nth remaining set pilot does not overlap one of the active, candidate, or neighbor set pilots in Step 325, the operation continues to Step 335 in which the parameter N is incremented to N=N+1. Next, in Step 340, the operation determines whether there exists an Nth remaining set pilot. When an Nth remaining set pilot exists, the operation cycles back to Step 325. When no Nth remaining set pilot exists, the operation ends. The operation of FIG. 3, thus limits the remainder set PN generation from including PNs within the remaining set window around active, neighbor, and candidate PNs.

Figure 4:
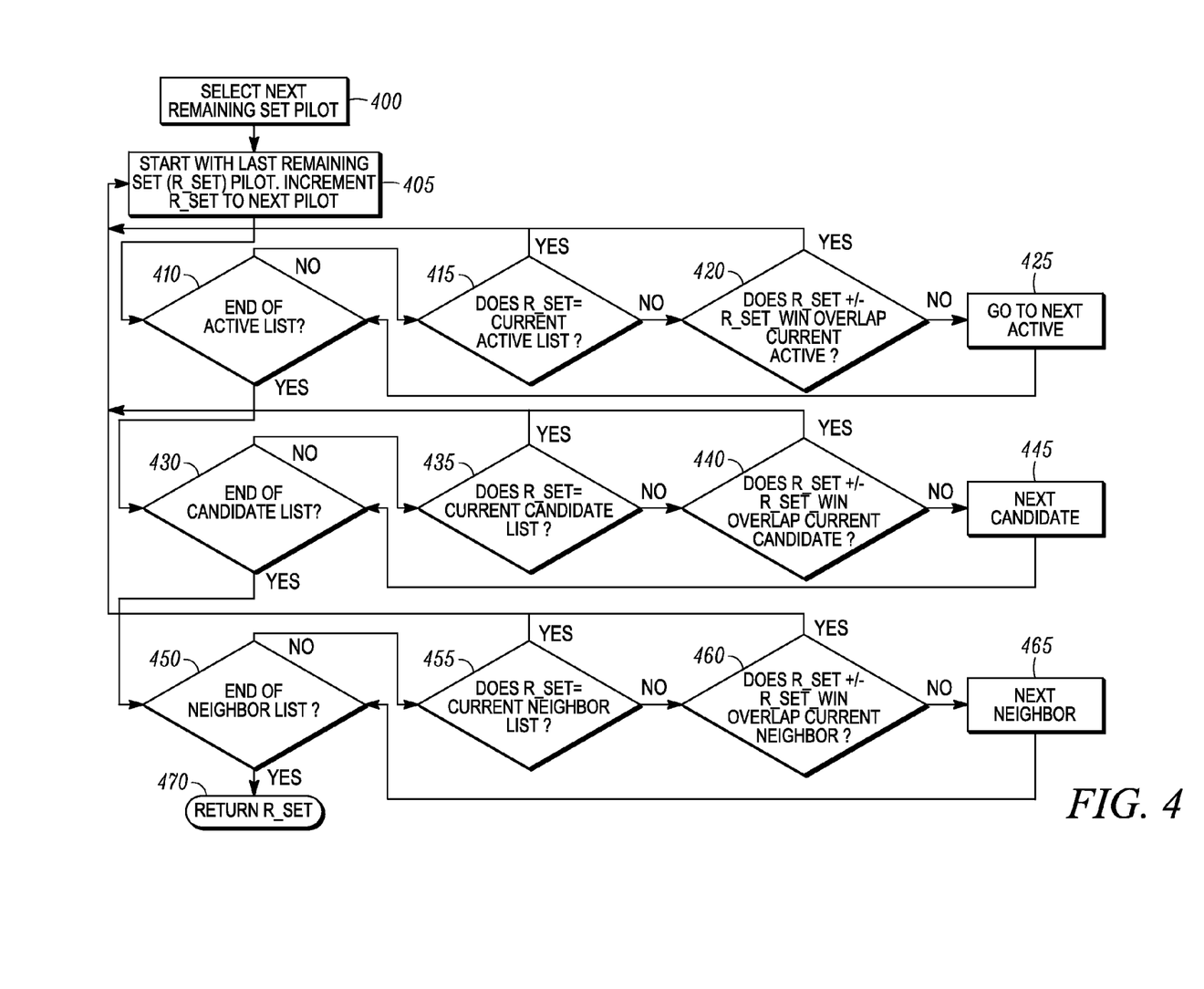

Referring to FIG. 4, more detail of the operation of the communication device 105 in accordance with the present invention is illustrated. The operation, for example, can be programmed into the controller 120 of the communication device 105. The operation begins with Step 400 in which the next remaining set pilot is selected. Next, in Step 405, the selection is made by starting with the last remaining set pilot and incrementing the remaining set pilot to the next remaining set pilot. Next, in Step 410, the operation determines whether the end of the active list has been reached. When the end of the active list has not been reached in Step 410, the operation continues with Step 415, in which it is determined whether the remaining set pilot selected in steps 400 and 405 is included with the current active list. When the selected remaining set pilot is included with the current active set list, the operation returns to Step 405. When the selected remaining set pilot is not included in the current active list, the operation continues to Step 420 in which it is determines whether the selected remaining set pilot surrounded by the remaining set window 225 overlaps a current active set pilot. When the selected remaining set pilot surrounded by the remaining set window 225 overlaps a current active set pilot, the operation returns to Step 405. When the selected remaining set pilot surrounded by the remaining set window 225 does not overlap a current active set pilot, the operation continues with Step 425 in which the next active set pilot is selected. The operation then returns to Step 410.

Returning to Step 410, when the end of the active list has been reached, the operation continues with Step 430 in which it is determined whether or not the end of the candidate list has been reached. When the end of the candidate list has not been reached, the operation continues with Step 435 in which it is determined whether the selected pilot is included within the current candidate list. When the selected pilot is included within the current candidate list, the operation returns to Step 405. When the selected pilot is not included within the current candidate list, the operation continues to Step 440 in which it is determined whether the selected remaining set pilot surrounded by the remaining set window 225 overlaps a current candidate pilot. When the selected remaining set pilot surrounded by the remaining set window 225 overlaps a current candidate pilot, the operation returns to Step 405. When the selected remaining set pilot surrounded by the remaining set window 225 does not overlap a current candidate pilot, the operation continues to Step 445 in which the next candidate pilot is selected. The operation then returns to Step 430.

Returning to Step 430, when the end of the candidate list has been reached, the operation continues to Step 450 in which it is determined whether or not the end of the neighbor list has been reached. When the end of the neighbor list has been reached, the operation continues to Step 470 returning to the remaining set. When the end of the current neighbor list has not been reached, the operation continues to Step 455 in which it is determined whether or not the selected pilot is included in the current neighbor list. When the selected pilot is included in the current neighbor list, the operation returns to Step 405. When the selected pilot is not included in the current neighbor list, the operation continues to Step 460 in which it is determined whether the selected pilot surrounded by the remaining set window 225 overlaps a current neighbor set pilot. When the selected pilot surrounded by the remaining set window 225 overlaps a current neighbor set window, the operation returns to Step 405. When the selected pilot surrounded by the remaining set window 225 does not overlap a current neighbor set pilot, the operation continues to Step 465 in which the next neighbor set pilot is selected. The operation then returns to Step 450.

Figure 7:
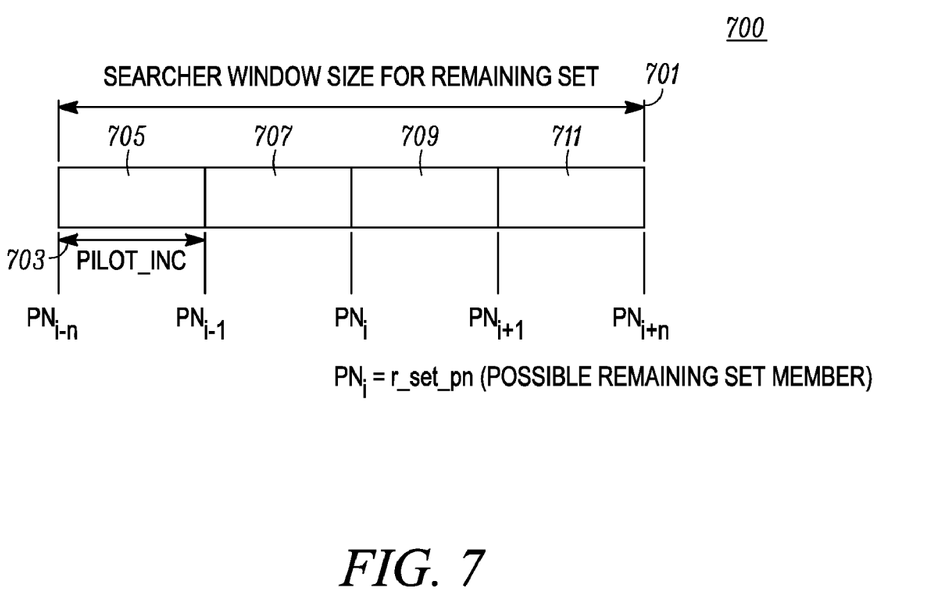
FIG. 7 is a diagram of a searcher window, showing the searcher window size for the remaining set.

The following scenario, shown in FIG. 7, illustrates the operation as described in FIG. 4 above: The remaining set contains all the pilots in PN space which aren't in any of the other sets (active, candidate, or neighbor). Each PN is separated by 'PILOT_INC' chips 703 defined by the network in neighbor list messages. The mobile will start with PN zero, check if this PN is in any other set. If not the mobile set search PN zero with the remaining set search window as defined in the SPM (System Parameters Message) or ESPM (Extend System Parameters Message). For the next remaining set search the mobile will try PN=1, and so forth to the end of PN space. When the mobile reaches the end of PN space it will start over again at PN zero. In addition to checking for an overlap with pilots in the active/candidate/neighbor set the mobile will check if the r_set member plus r_set_window size will overlap any of the active set members, candidate set members, or neighbor set members. If an overlap is detected then don't use the r_set candidate as a remaining set pilot, and go to the next potential remaining set member in PN space. This will prevent an active/candidate/neighbor pilot from failing within an r_set pilots search window 700.

The Algorithm below is one example of the operation which can be programmed into the controller 120 for implementing the operation of FIGS. 3 and 4: Given:

Active Set Pilots=$A_0, A_1, A_2, \ldots, A_{an}$; where an=number of actives

Candidate Set Pilots=$C_0, C_1, C_2, \ldots, C_{cn}$; where cn=number of candidates Neighbor Set Pilots=$N_0, N_1, N_2, \ldots, N_n$; where n=number of neighbors Searcher Window Size for Remaining Set $PN_i$ = r_set_pn (possible remaining set member)

In the remaining pilot set member generation function given the potential remaining set member is PN=r_set_pn, add code to check:

Active pilot checks, add checks for:

If any $A_0$ through $A_{an}$ is greater than or equal to $PN_{i-n}$ and less than and equal to $PN_{i+n}$ then eliminate r_set_pn as a remaining set member. That is, if any active pilot is found within the remaining set searcher window 700, as determined by the number of chips (i.e. "pilot_inc" chips 703) in the intervals 705, 707, 709 and 711, which make up the searcher window size 701 for the remaining set, then that overlapping pilot is eliminated from the remaining set.

Candidate pilot checks, add checks for:

If any $C_0$ through $C_{cn}$ is greater than or equal to $PN_{i-n}$ and less than and equal to $PN_{i+n}$ then eliminate r_set_pn as a remaining set member. That is, if any candidate pilot is found within the remaining set searcher window 700, as determined by the number of chips (i.e. "pilot_inc" chips 703) in the intervals 705, 707, 709 and 711, which make up the searcher window size 701 for the remaining set, then that overlapping pilot is eliminated from the remaining set.

Neighbor pilot checks, add checks for:

If any $N_0$ through $N_n$ is greater than or equal to $PN_{i-n}$ and less than and equal to $PN_{i+n}$ then eliminate r_set_pn as a remaining set member. That is, if any neighbor pilot is found within the remaining set searcher window 700, as determined by the number of chips (i.e. "pilot_inc" chips 703) in the intervals 705, 707, 709 and 711, which make up the searcher window size 701 for the remaining set, then that overlapping pilot is eliminated from the remaining set.

Figure 5:
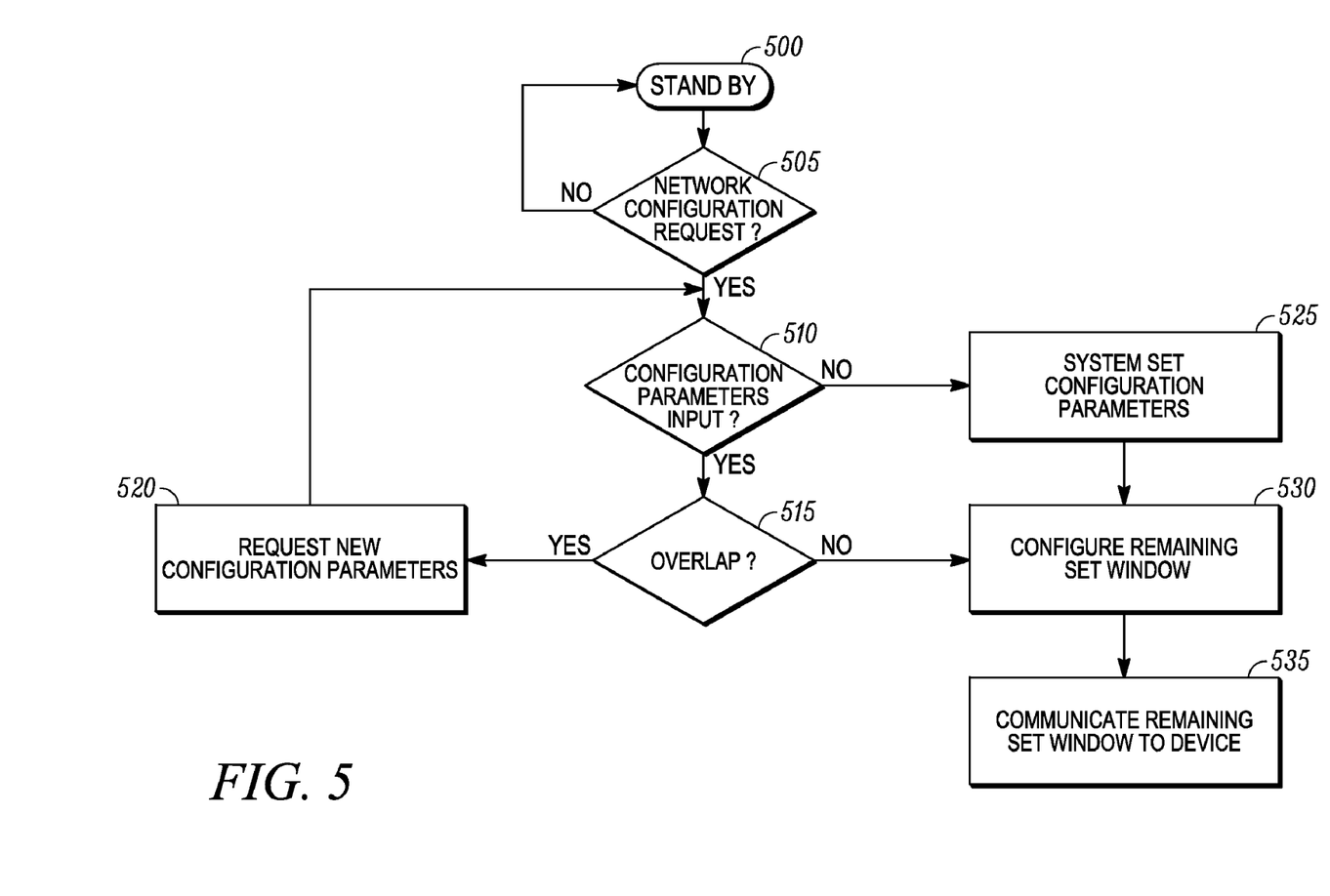

Referring to FIG. 5, a network based example of the present invention is illustrated. As illustrated, the operation begins with Step 500 in which the base station (for example, 130, 135, 140 of FIG. 1) is in standby mode. Next, in Step 505, the operation determines whether or not a network configuration request has been received. For example, a user request for a network configuration can be communicated from a communication device to the base station. When no network configuration request is detected, the operation returns to standby Step 500. When a network configuration request is detected, the operation continues with Step 510, in which it is determined whether or not configuration parameters have been input. When configuration parameters have been input in Step 510, the operation continues to Step 515 in which it is determined whether an overlap condition will occur (as described previously herein) if the input configuration parameters are implemented. In other words, the base station will verify that the remaining set window size 701 is not too large to cause an overlap condition to occur. When an overlap condition will occur in Step 515, the operation continues to Step 520 in which new configuration parameters are requested. The operation then cycles back to Step 510.

Returning to Step 510, when no configuration parameters have been input, the operation continues to Step 525 in which the system sets the configuration parameters. Next, in Step 530, and when no overlap is detected in Step 515, the system configures the remaining set window 700 to prevent an overlap of one or more remaining set pilots with one or more other pilots of the pilot set. Next in Step 535, the remaining set window 700 is communication to the communication device.

An example algorithm for implementing the operation of FIG. 5 is as below:

During user input of configuration parameters add:

---

IF r_set_window divided by two equal or larger than pilot_inc 703
THEN
    Warn user of illegal input
        End input session
ENDIF

---

Figure 6:
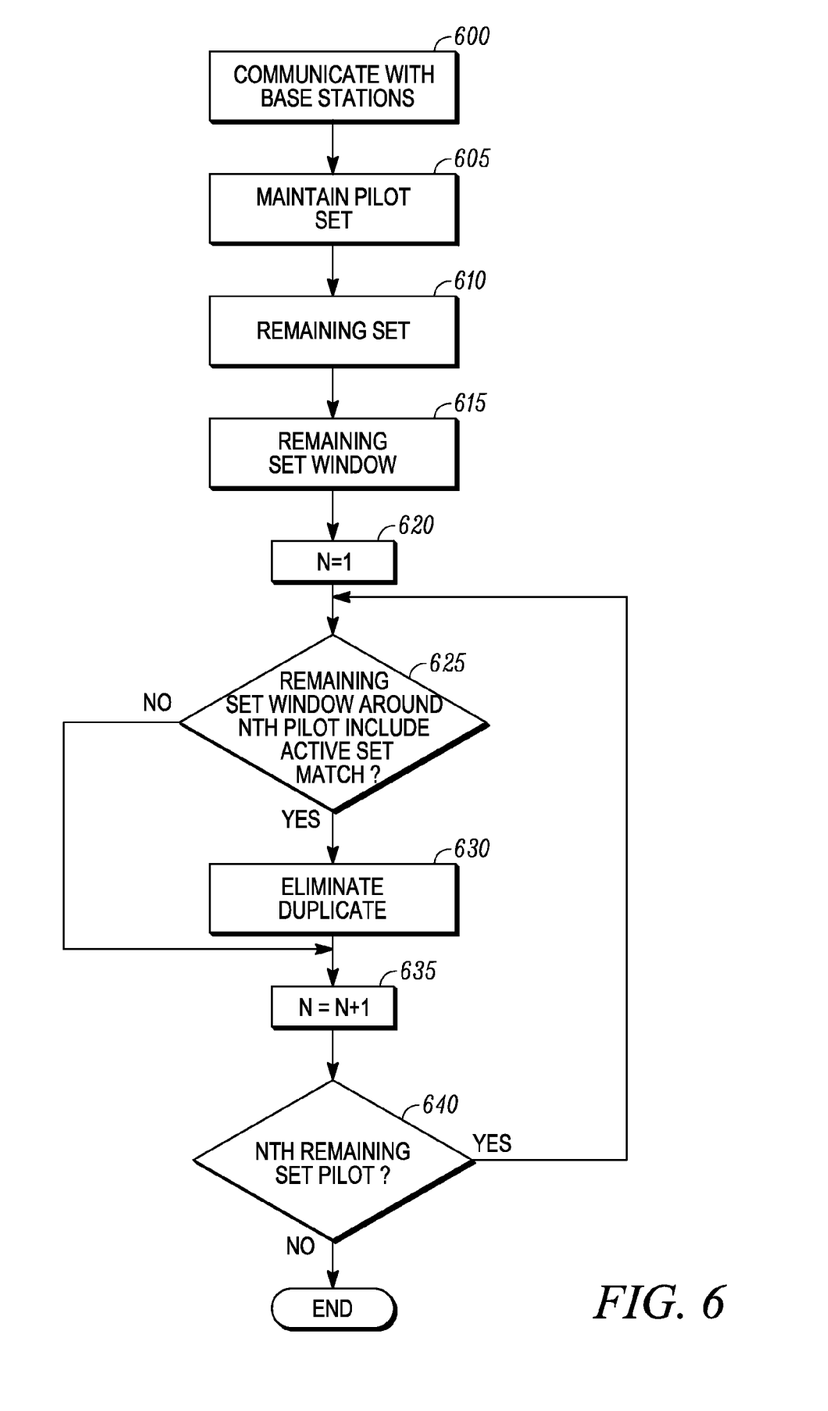

Referring to FIG. 6, an example operation of the communication device 105 in accordance with the present invention is illustrated. As shown, the operation begins with Step 600 in which the communication device 105 communicates with one or more base stations 110. Next in Step 605, the communication device maintains a pilot set 200 as described previously herein. Next, in Step 610, the communication device 105 allocates one or more pilots not found in the active set, the candidate set, or the neighbor set of the pilot set 200 to the remaining set. Next, in Step 615, the communication device provides the remaining set window 225 around each of the remaining set pilots. Next, in Step 620, a parameter is set to N=1. Next, in Step 625, the operation determines whether or not the remaining set window around the Nth pilot includes an active set match. For example, the communication device 105 can compare one or more multi-path components resulting from a search of the active set. When a match is detected, the operation continues to Step 630 in which the duplicate is eliminated. Next, and when no match is detected in Step 625, the operation continues to Step 635 in which the parameter is incremented to N=N+1. Next, in Step 640, it is determined whether or not an Nth remaining set pilot exists. When an Nth remaining set pilot exists, the operation returns to Step 625. When no Nth remaining set pilot exists, the operation ends.

The present invention will keep a communication device from generating unnecessary signaling or having some other bad side effect depending on the infrastructure provider's implementation. Further, the present invention will improve data throughput not only for VOIP applications but also for other data applications. This makes the phone more robust in protecting it from bad network configuration settings. Further, the present invention will reduce battery usage as the communication device will not enter unnecessary idle modes.

In the foregoing specification, the invention and its benefits and advantages have been described with reference to specific embodiments. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

What is claimed is:

1. A method within a communication device for preventing reporting of duplicate pilots within a communication system, the method comprising the steps of:

communicating with one or more base stations;
    monitoring and maintaining a pilot set including:
        an active set comprising one or more active set pilots,
        a candidate set comprising one or more candidate set pilots, and
        a neighbor set comprising one or more neighbor set pilots;
    allocating one or more pilots not found in the active set, the candidate set, or the neighbor set to a remaining set comprising one or more remaining set pilots;
    providing a remaining set window around each remaining set pilot, said remaining set window having a size determined by an overall number of chips, said remaining set window being segmented by a plurality of chip intervals, each chip interval of said plurality of chip intervals having a corresponding remaining set pilot; and eliminating a remaining set pilot, from said remaining set, when the remaining set window around the remaining set pilot overlaps any of the active, the candidate, or the neighbor set pilots.

2. A method as recited in claim 1, further comprising, prior to the monitoring step, the step of:

allocating one or more pilots associated with one or more forward traffic channels assigned to service the communication device to the active set.

3. A method as recited in claim 1, further comprising, prior to the monitoring step, the step of:

allocating one or more pilots that are not currently in the active set but have been received by the communication device with sufficient signal strength to indicate that the associated forward traffic channels could be successfully demodulated to the candidate set.

4. A method as recited in claim 1, further comprising, prior to the monitoring step, the step of:

allocating one or more pilots that are not currently in the active set or the candidate set but are likely candidates for hand off to the neighbor set.

5. A method as recited in claim 1, further comprising the steps of:

checking for an overlap between each of the active set pilots, candidate set pilots, and neighbor set pilots; and eliminating one of the overlapping pilots.

6. A method within a communication system for preventing reporting of duplicate pilots, the method comprising the steps of:

communicating with one or more base stations;

monitoring and maintaining a pilot set including:
an active set comprising one or more active set pilots,
a candidate set comprising one or more candidate set pilots, and
a neighbor set comprising one or more neighbor set pilots;

allocating one or more pilots not found in the active set, the candidate set, or the neighbor set to a remaining set comprising one or more remaining set pilots;

providing a remaining set window around a remaining set pilot, said remaining set window having a size determined by an overall number of chips, said remaining set window being segmented by a plurality of chip intervals, each chip interval of said plurality of chip intervals having a corresponding remaining set pilot;

searching the remaining set window centered around the remaining set pilot;

comparing one or more multi-path components resulting from the search to the active set; and eliminating a multi-path component with a duplicate is detected from the comparing step.

7. A method as recited in claim 6, further comprising:

repeating the providing, searching, comparing, and eliminating steps for each of the one or more remaining set pilots of the remaining set.

8. A method as recited in claim 7, further comprising the step of:

communicating the search results to the one or more base stations as part of a handoff process.

* * * * *

UNITED STATES PATENT AND TRADEMARK OFFICE
CERTIFICATE OF CORRECTION

PATENT NO. : 7,609,676 B2  Page 1 of 1
APPLICATION NO. : 11/171618
DATED : October 27, 2009
INVENTOR(S) : Welnick et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 699 days.

Signed and Sealed this

Twelfth Day of October, 2010

David J. Kappos
*Director of the United States Patent and Trademark Office*